United States Patent [19]

Maskasky

[11] Patent Number: 5,284,744
[45] Date of Patent: Feb. 8, 1994

[54] NON-ULTRAVIOLET-ABSORBING PEPTIZER FOR SILVER HALIDE EMULSIONS

[75] Inventor: Joe E. Maskasky, Rochester, N.Y.

[73] Assignee: Eastman Kodak Company, Rochester, N.Y.

[21] Appl. No.: 935,810

[22] Filed: Aug. 27, 1992

[51] Int. Cl.$^5$ ............................................. G03C 1/015
[52] U.S. Cl. .................................... 430/569; 430/639; 430/641
[58] Field of Search ........................ 430/569, 639, 641

[56] References Cited

U.S. PATENT DOCUMENTS

| | | | |
|---|---|---|---|
| 2,343,650 | 3/1944 | Fallesen | 95/7 |
| 4,717,650 | 1/1988 | Ikeda et al. | 430/567 |
| 4,798,775 | 1/1989 | Yagi et al. | 430/567 |

OTHER PUBLICATIONS

Encyclopedia of Polymer Science and Engineering, vol. 7, John Wiley & Sons, Inc., 1987, pp. 602–610.
Research Disclosure, vol. 308, Dec. 1989, Item 308119, Section IX, Vehicles and vehicle extenders.

Primary Examiner—Janet C. Baxter
Attorney, Agent, or Firm—Carl O. Thomas

[57] ABSTRACT

Silver halide emulsions can be prepared by precipitating the silver halide grains in the presence of a peptizer comprising a water-soluble starch, said peptizer exhibiting an absorbance of less than 1.0 in the wavelength region 200 to 400 nm when measured at a concentration of 2 g/L through a 1 cm transmission path. A useful water-soluble starch having this property is potato starch. Silver halide elements sensitive in the short ultraviolet spectral region can be prepared with these emulsions.

8 Claims, 3 Drawing Sheets 1.0 μm 1.0 μm 1.0 μm

NON-ULTRAVIOLET-ABSORBING PEPTIZER FOR SILVER HALIDE EMULSIONS

FIELD OF THE INVENTION

The invention relates to a process for precipitation of radiation-sensitive silver halide emulsions useful in photography.

BACKGROUND OF THE INVENTION

The most commonly employed photographic elements are those which contain a radiation-sensitive silver halide emulsion layer coated on a support. Although other ingredients can be present, the essential components of the emulsion layer are radiation-sensitive silver halide microcrystals, commonly referred to as grains, which form the discrete phase of the photographic emulsion, and a vehicle, which forms the continuous phase of the photographic emulsion.

It is important to recognize that the vehicle encompasses both the peptizer and the binder employed in the preparation of the emulsion layer. The peptizer is present during the precipitation of the grains to avoid their coalescence or flocculation. While a variety of hydrophilic colloids are known to be useful peptizers, it has been well known that the preferred peptizers are forms of gelatin, e.g., alkali-treated gelatin (cattle bone or hide gelatin) or acid-treated gelatin (pigskin gelatin), and gelatin derivatives, such as acetylated or phthalated gelatin.

There are some problems, however, associated with nitrogen- and sulfur-containing vehicles such as gelatin. Gelatin absorbs ultraviolet light, particularly in the regions of the spectrum less than 300 nm. Although silver halide is light sensitive throughout the region 200 to 400nm, its sensitivity throughout much of this region is masked by the absorption of light by the vehicle in which it is dispersed as well as by glass usually used for lenses in exposure devices. Special techniques have been required to minimize the concentration of gelatin in the light-sensitive layers of spectroscopic plates designed for recording ultraviolet light. In addition, some metal ions, potentially of value as dopants, are so tightly adsorbed to vehicles such as gelatin that they are not incorporated into the precipitated grains.

Materials useful as peptizers, particularly gelatin and gelatin derivatives, are also commonly employed as binders in preparing an emulsion for coating. However, many materials are useful as vehicles, including materials referred to as vehicle extenders, such as latices and other hydrophobic materials, which are ineffective peptizers. A listing of known vehicles is provided by *Research Disclosure*, Vol. 308, Dec. 1989, Item 308119, Section IX, Vehicles and vehicle extenders. *Research Disclosure* is published by Kenneth Mason Publications Ltd., Emsworth, Hampshire, P010 7DD, England. Among the vehicles listed are some polysaccharides: dextran, gum arabic, pectin, and agar-agar. Only citrus pectin has been described by Fallesen U.S. Pat. No. 2,343,650 as a peptizer for silver halide but makes no reference to its absorption of ultraviolet light.

SUMMARY OF THE INVENTION

I have discovered a process by which a silver halide emulsion can be successfully prepared by precipitating the silver halide grains in the presence of a peptizer comprising a water-soluble starch, said peptizer exhibiting an absorbance of less than 1.0 in the wavelength region 200 to 400 nm when measured at a concentration of 2 g/L through a 1 cm transmission path. A useful water-soluble starch is potato starch.

DETAILED DESCRIPTION OF THE INVENTION

Figure 1:
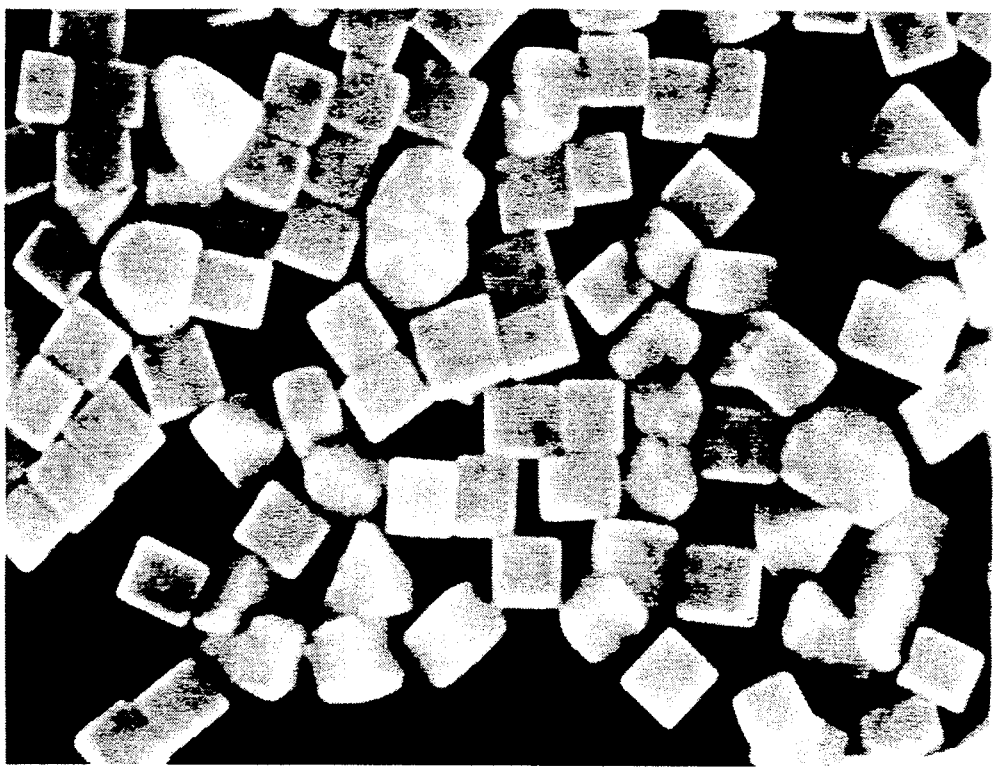
FIGS. 1 & 2 show electron micrographs of a starch-peptized emulsion as described in Example 1 of the invention, showing an angle of view at 0° and 60°, respectively.

The precipitation of a silver halide emulsion of the invention is carried out by the reaction of a soluble halide salt and a soluble silver salt in the presence of water-soluble starch as a peptizer. Any form of starch can be used providing that it is water-soluble in the concentrations necessary to provide protection of the grains from coalescence or flocculation. Potato starch is water-soluble and is commonly available and inexpensive. Peptizer concentrations of from 0.2 to 10 percent, by weight, preferably 1 to 3 percent, based on the total weight of emulsion as prepared by precipitation, can be employed. Mixtures of water-soluble starches are also contemplated as peptizers within the invention as equivalent to starch from a single source. Any of the silver halides can be precipitated in the presence of water-soluble starch as a peptizer. The silver halide emulsions can be comprised of silver bromide, silver chloride, silver iodide, or mixtures thereof. The emulsions can include coarse, medium or fine silver halide grains and can be prepared by a variety of techniques, e.g., single-jet, double-jet (including continuous removal techniques) accelerated flow rate and interrupted precipitation techniques. Emulsions having different grain sizes and halide compositions can of course be blended to achieve desired effects.

Metal ion dopants can be present during the precipitation in the presence of a water-soluble starch as a peptizer. The metals introduced during grain nucleation and/or grain growth can enter the grains as dopants to modify photographic properties, depending on their level and location within the grains. Because starch is substantially free of nitrogen and sulfur containing material, which forms stable complexes with some metals, it may be possible in the absence of such complexing peptizers to more readily incorporate certain metals into the grains, e.g, platinum, palladium, iron, copper, and nickel compounds.

It is common practice to maintain the concentration of the peptizer in the emulsion as initially prepared below about 6 percent, based on total emulsion weight, and to adjust the emulsion vehicle concentration upwardly for optimum coating characteristics by delayed additions of a binder. For example, the emulsion as initially prepared commonly contains from about 5 to 50 grams of peptizer per mole of silver, more typically from about 10 to 30 grams of peptizer per mole of silver. The emulsions can be washed by adding a macromolecular coagulant that contains carboxylate groups which cause the emulsion of precipitate at low pH, allowing separation of soluble salts. One such coagulant is sodium polymethacrylate as described in Japanese Kokai publication 03-288143A. The starch-peptized emulsions can alternatively be washed by centrifugation and decantation, by employing hydrocyclones alone or in combination with centrifuges, or by diafiltration with a semipermeable membrane according to references cited in *Research Disclosure*, Vol. 308, Dec. 1989, Item 308119, Section II, Emulsion Washing.

The precipitation can be completed in the presence of starch or, at some stage of the addition of the silver and halide ions if the non-ultraviolet-absorbing properties are not important to the end use, gelatin or other peptizer can be added to complete the precipitation process. A film-forming binder can be added to a starch-peptized emulsion prior to coating to bring the total vehicle concentration up to a level suitable for coating the layer on a support.

Another advantage of precipitating emulsions using starch as a peptizer over gelatin and other nitrogen- and sulfur-containing peptizers is the capability of a more complete removal of peptizer from silver halide surfaces. Starch, the oxygen atoms of which complex less strongly with silver ions, should be much more easily removed using enzymes. Enzymes can break down starch into highly water-soluble disaccharides and glucose which are not tightly adsorbed to the grains. This property should be useful in preparing grains, the surface of which can be examined more readily in physical studies such as atomic force microscopy.

It was also unexpectedly discovered that, in the course of chemical sensitization of a starchpeptized emulsion, performed by heating with sulfur and gold sensitizers, very little increase in $D_{min}$ resulted. Although optimum speed was apparently dependent on the level of sensitizers used and the time of heating, there was very little increase in $D_{min}$ following sensitization and coating in a starch binder.

The invention also contemplates a silver halide element comprising a support and at least one silver halide emulsion precipitated in the presence of a peptizer and suspended in the presence of a film-forming binder both of which are transparent to ultraviolet light, i.e., that exhibit an absorbance of less than 1.0 in the wavelength region 200 to 400 nm when measured at a concentration of 2 g/L through a 1 cm transmission path. Because starch has no significant absorption in the region of 200 to 250 nm where gelatin absorbs light to a high degree, a photographic element comprising an emulsion peptized by water-soluble starch and dispersed in a non-ultraviolet-absorbing binder, such as additional starch, would be substantially more sensitive in recording short ultraviolet radiation than an element containing a gelatin as peptizer and binder.

A starch-peptized silver halide emulsion made up in a non-ultraviolet-absorbing, film-forming binder can be coated directly on a wettable support or, preferably, over the surface of a pad of a water-absorptive vehicle such as gelatin to provide an ultraviolet-sensitive element. The water-soluble starch itself provides such a binder.

The concentration of the vehicle in a silver halide emulsion layer is preferably above 10 grams per mole of silver. In a completed silver halide photographic element the vehicle preferably forms about 30 to 70 percent by weight of the emulsion layer. Thus, the major portion of the vehicle in the emulsion layer is typically not derived from the peptizer but from the film-forming binder that is later introduced.

Chemical and spectral sensitization of the emulsions of the invention can be carried out by methods well known in the art by compounds and procedures described in *Research Disclosure*, Item 308119, loc. cit., Sections III and IV. Other addenda compatible with a starch vehicle can be used, in particular antifoggants, stabilizers, absorbing dyes, coating aids, plasticizers, and lubricants, also described in *Research Disclosure*, Item 308119. Hardeners capable of crosslinking aliphatic hydroxyl groups would be especially contemplated to operate with starch as a binder in a silver halide layer.

The starch-peptized emulsions of this invention can be used in otherwise conventional photographic elements to serve varied applications including black-and-white and color photography, either as camera or print materials; image transfer photography; photothermography and radiography. Other sections of *Research Disclosure*, Item 308119 illustrate features particularly adapting the photographic elements to such varied applications.

EXAMPLES

The invention can be better appreciated by reference to the following specific examples.

EXAMPLE 1

Starch-peptized silver halide grains

Figure 2:

A silver bromide emulsion was made using potato starch as the peptizer. An elemental analysis of the potato starch revealed that its content of sulfur and nitrogen was below the detection limit (<0.3%). A reaction vessel contained 400 mL of a solution that was 2% in soluble potato starch that had been dissolved by boiling the mixture for 1 minute. To this stirred solution at 70° C. was added 2M silver nitrate solution at 0.5 mL/min for 2 min and then the rate of addition was linearly accelerated over an additional period of 30 min (23 times from start to finish) and finally held constant at 11.5 mL/min until 200 mL of solution was consumed. During the addition of the silver nitrate solution, 2M sodium bromide solution was added at a rate needed to maintain a constant pAg of 5.84 (pBr of 4.61). When all of the silver nitrate solution was consumed, the temperature was lowered to 40° C.; and the emulsion was divided into two equal parts. The pH of the emulsion was found to be 4.12 at 40° C.; it was made up of mostly cubic grains having an average edge length of 0.43μm. The emulsion is shown in FIGS. 1 and 2.

Part 1.

To one part of the above emulsion was added 50 mL of a 10% phthalated gelatin solution; after stirring for 15 min, the emulsion was poured into 1 L of distilled water and washed by the coagulation method of U.S. Pat. No. 2,614,929 to make Part 1.

EXAMPLE 2

Chemical and spectral sensitization and preparation of a gelatin-containing photographic element.

A portion of the emulsion of Part 1 of Example 1 was adjusted to a pH of 6.2, pBr of 3.38; then solutions of $4.8 \times 10^{-5}$ mole/Ag mole of sodium thiosulfate and $1.57 \times 10^{-5}$ mole/Ag mole of potassium tetrachloroaurate were added and the mixture heated for 15 minutes at 65° C. After cooling to 40° C., a methanol solution of 0.30 mmole/Ag mole of anhydro-5chloro-9-ethyl-5'-phenyl-3-(3-sulfobutyl)-3'hydroxide was added. The resulting emulsion was coated on polyester film support at 4.8 Ag/m$^2$ and 3.9 g gelatin/m$^2$.

A non-chemically sensitized emulsion coating was prepared by using the above procedure but not adding the sodium thiosulfate or the potassium tetrachloroaurate solutions.

Coatings of the nonsensitized emulsion A and the chemically sensitized emulsion B were exposed for 0.01 sec to a 600W, 3,000° K. tungsten light source through a 0 to 4.0 density step tablet. The exposed coatings were developed in Kodak Rapid X-ray Developer for 1 min. Coatings of the emulsion were also exposed to a variable wavelength (x-axis), variable intensity (y-axis) wedge spectrograph and developed. The results are summarized in Table 1.

TABLE 1

| Sensitometry of Layer with Gelatin Binder | | | | | |
|---|---|---|---|---|---|
| Coating | Chem. Sens. | $D_{min}$ | $D_{max}$ | Contrast | Rel. Speed | Peak Spectral Response |
| A | No | 0.05 | 2.17 | 1.8 | 100 | 550 nm |
| B | Yes | 0.54 | 2.64 | 1.8 | 437 | 550 nm |

EXAMPLE 3

Comparison of the spectral properties of potato starch and gelatin

Figure 3:
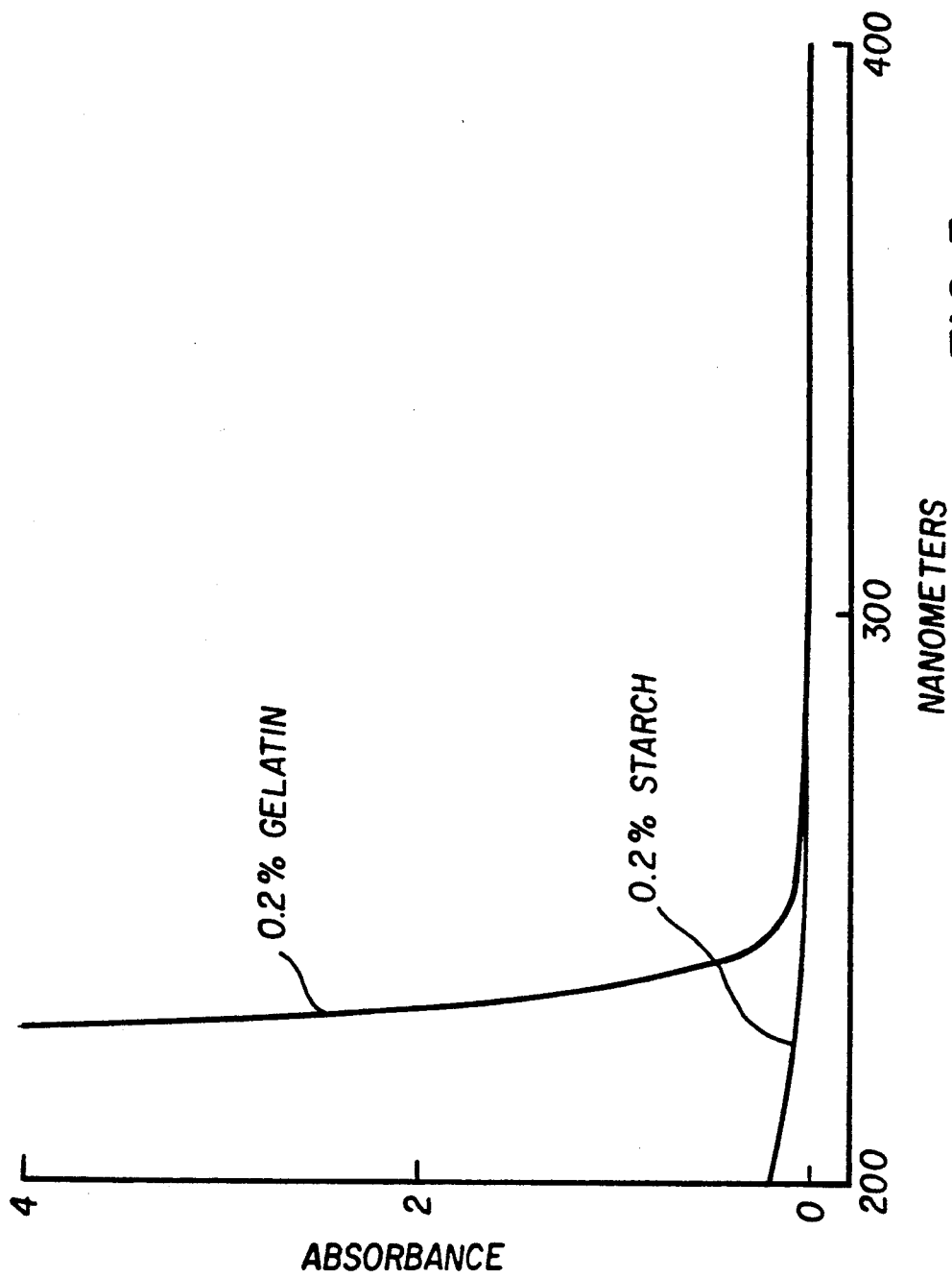
FIG. 3 shows the absorbance curves of 0.2% (2 g/L) solutions of gelatin and water-soluble starch measured against water over the range 200 to 400 nm.

The absorbance of a 0.2% (2 g/L) by weight of a bone gelatin solution and a 0.2% (2 g/L) by weight of a potato starch solution were measured between 200 to 400 nm. The starch solution showed almost no absorbance over this range while the gelatin solution absorbed strongly over the range of 200 to 250 nm. The absorbance Curves are shown in FIG. 3.

EXAMPLE 4

Preparation of a chemically sensitized silver halide photographic element sensitive to short wavelength radiation The emulsion of Example 1, (gelatinfree) (hereinafter referred to as Part 2) was adjusted to pBr of 3.14 at 40° C. with a sodium bromide solution. To a portion of this emulsion were added $1.0 \times 10^{-5}$ mole/Ag mole of sodium thiosulfate and $0.65 \times 10^{-5}$ mole/Ag mole of potassium tetrachloroaurate and the mixture was heated 5 min at 65° C. The resulting gelatin-free emulsion and a portion of the non-chemically sensitized Example 1, Part 2 emulsion were diluted with a 4% solution of potato starch, coating surfactant was added, and the mixture was coated on a cellulose acetate film support having a thin (0.075 g/m²) gelatin layer for adhesion to make Coatings C and D, respectively. The coatings were 2.15 g/m² in silver and 2.41 g/m² in starch.

Coatings C and D were exposed for 1.0 sec to a 600W, 3,000° K tungsten light source through a 0 to 4.0 density step-tablet. The exposed coatings were developed in Kodak DK-50 developer for 2 min. The results are summarized in Table 2.

TABLE 2

| Sensitometry of Layer with Starch Binder | | | | | |
|---|---|---|---|---|---|
| Coating | Chem. Sens | $D_{min}$ | $D_{max}$ | Contrast | Rel. Speed |
| C | Yes | 0.05 | 1.42 | 0.78 | 870 |
| D | No | 0.03 | 0.93 | 0.97 | 100 |

It was surprising that the chemically sensitized coating had such a small increase in $D_{min}$.

EXAMPLE 5.

Short wavelength exposure

To demonstrate the ability to use starch-containing emulsion coatings to make spectroscopic ultraviolet exposures, Coatings C and D of Example 4 were given 254 nm exposures through a metal foil having a cut-out pattern. The coatings were developed in Kodak DK 50 Developer for 2 min. The coatings produced a $D_{max}$ density image of the foil pattern.

The invention has been described in detail with particular reference to a particular embodiment thereof, but it will be understood that variations and modification can be effected within the spirit and scope of the invention.

What is claimed is:

1. A process for precipitating a silver halide emulsion comprising precipitating silver halide in the absence of gelatin or a gelatin derivative and in the presence of a peptizer consisting essentially of a water-soluble starch, said peptizer exhibiting an absorbance of less than 1.0 in the wavelength region of 200 to 400 nm when measured at a concentration of 2 g/L through a 1 cm transmission path.

2. A process according to claim 1 wherein said peptizer exhibits an absorbance of less than 0.5 in the wavelength region 200 to 400 nm when measured at a concentration of 2 g/L through a 1 cm transmission path.

3. A process according to claim 2 wherein said peptizer exhibits an absorbance of less than 0.3 in the wavelength region 200 to 400 nm when measured at a concentration of 2 g/L through a 1 cm transmission path.

4. A process for precipitating a silver halide emulsion comprising precipitating silver halide grains in the absence of a gelatin or a gelatin derivative and in the presence of a water-soluble starch which consists essentially of potato starch.

5. A silver halide emulsion free of gelatin or a gelatin derivative and precipitated in the presence of a peptizer consisting essentially of a watersoluble starch, said peptizer exhibiting an absorbance of less than 1.0 in the wavelength region of 200 to 400 nm when measured at a concentration of 2 g/L through a 1 cm transmission path.

6. A silver halide emulsion according to claim 5 wherein said peptizer exhibits an absorbance of less than 0.5 in the wavelength region 200 to 400 nm when measured at a concentration of 2 g/L through a 1 cm transmission path.

7. A silver halide emulsion according to claim 6 wherein said peptizer exhibits an absorbance of less than 0.3 in the wavelength region 200 to 400 nm when measured at a concentration of 2 g/L through a 1 cm transmission path.

8. A silver halide emulsion free of gelatin or a gelatin derivative and precipitated in the presence of a peptizer which consists essentially of potato starch, said peptizer exhibiting an absorbance of less than 1.0 in the wavelength region of 200 to 400 nm when measured at a concentration of 2 g/L through a 1 cm transmission path.

* * * * *